US012763271B2

(12) United States Patent
Mittelstadt

(10) Patent No.: US 12,763,271 B2
(45) Date of Patent: Oct. 13, 2026

(54) SELF-TESTING SOLID STATE CIRCUIT BREAKING COMPONENTS IN CIRCUIT BREAKERS

(71) Applicant: Schneider Electric USA, Inc., Andover, MA (US)

(72) Inventor: Chad R. Mittelstadt, Cedar Rapids, IA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 19/022,454

(22) Filed: Jan. 15, 2025

(65) Prior Publication Data

US 2026/0204492 A1 Jul. 16, 2026

(51) Int. Cl.
*H02H 3/08* (2006.01)
*H01H 9/54* (2006.01)

(52) U.S. Cl.
CPC .................................. *H01H 9/548* (2013.01)

(58) Field of Classification Search
CPC ................................ H01H 9/548; H01H 9/56
See application file for complete search history.

(56) References Cited

U.S. PATENT DOCUMENTS 10,126,346 B2 11/2018 Gass et al.
11,501,929 B1 * 11/2022 Fleege .................. H01H 3/264
2009/0134841 A1 * 5/2009 Gilmore ............. H01M 10/482 320/136
2018/0321317 A1 * 11/2018 Machado Pinto Brasil ................ G01R 31/327
2020/0122583 A1 * 4/2020 Harvey ................. H02J 7/0068
2020/0395748 A1 * 12/2020 Miller ................ H05K 7/20918
2022/0199345 A1 * 6/2022 Mittelstadt ............. H01H 71/04
2023/0207244 A1 * 6/2023 Mittelstadt ......... H01H 71/0207 335/35
2023/0396052 A1 12/2023 Wu et al.
2024/0222953 A1 * 7/2024 Mittelstadt ............... H02H 3/28
2024/0258057 A1 * 8/2024 Domejean ............ H01H 33/596
2025/0228020 A1 * 7/2025 Shiraishi ............... H10F 39/806

FOREIGN PATENT DOCUMENTS

CN 207852601 U 9/2018
CN 211350506 U 8/2020
CN 211826372 U 10/2020

* cited by examiner

*Primary Examiner* — Ryan Johnson
*Assistant Examiner* — Esayas G Yeshaw
(74) *Attorney, Agent, or Firm* — Kinney & Lange, P.A.

(57) ABSTRACT

A circuit breaker includes a breaker body with a circuit therethrough from a line terminal to a load terminal. A pair of isolation contacts in the circuit are configured to close the circuit in a closed state with the isolation contacts touching one another and to break the circuit in an open state with the isolation contacts spaced apart from one another. A solid-state breaking switch is connected in the circuit in electrical series with the isolation contacts so both the solid-state breaking switch and the isolation contacts have to be closed in order for current to flow in the circuit. A controller is operatively connected to control the solid-state breaking switch based on the open state or the closed state of the isolation contacts and based on electrical current passing through the circuit.

20 Claims, 6 Drawing Sheets

SELF-TESTING SOLID STATE CIRCUIT BREAKING COMPONENTS IN CIRCUIT BREAKERS

BACKGROUND

1. Field

This disclosure relates to circuit breakers, and more particularly to circuit breakers that include solid state circuit breaking components.

2. Description of Related Art

There is a developing demand for solid state circuit breakers (SSCBs), including for residential use such as miniature circuit breakers (MCBs). Circuit breaker designs must comply with codes and standards, but the codes and standards are in development for solid state circuit breakers in applications like MCBs. SSCBs rely on the proper ON/OFF operation of the solid-state devices of the circuit breaker to limit fault current and ON/OFF sequencing timing has to match properly that of mechanical isolation contacts. If they do not match, the SSCB should not pass standards testing, e.g., testing by UL Solutions Inc. of Northbrook, Illinois.

The conventional techniques have been considered satisfactory for their intended purpose. However, there is an ever-present need for improved systems and methods for solid state circuit breakers. This disclosure provides a solution for this need.

SUMMARY

A circuit breaker includes a breaker body with a circuit therethrough from a line terminal to a load terminal. A pair of isolation contacts in the circuit are configured to close the circuit in a closed state with the isolation contacts touching one another and to break the circuit in an open state with the isolation contacts spaced apart from one another. A solid-state breaking switch is connected in the circuit in electrical series with the isolation contacts so both the solid-state breaking switch and the isolation contacts have to be closed in order for current to flow in the circuit. A controller is operatively connected to control the solid-state breaking switch based on the open state or the closed state of the isolation contacts and based on electrical current passing through the circuit.

A main circuit sensor can be operatively connected to the circuit to provide feedback to the controller indicative of electrical current in the circuit. A neutral line can run through the breaker body from a neutral terminal to a return terminal. A ground fault circuit interrupter (GFCI) differential sensor can be operatively connected to the circuit to provide feedback to the controller indicative of ground fault status of the circuit. A switch handle can be operatively connected to the isolation contacts to move a moveable one of the isolation contacts between the open and closed states for manual control of the circuit by a user.

A test circuit can be electrically connected to the circuit at a first node that is in series between the isolation contacts and the solid-state breaking switch and can be electrically connected to the neutral line at a second node. A test switch can be included in the test circuit in electrical series between the first node and the second node. The test switch can be operatively connected to a switch handle of the isolation contacts and to the controller to provide feedback to the controller indicative of position of the switch handle. A test sensor can be operatively connected to the test circuit and to the controller to provide feedback to the controller indicative of electrical current in the test circuit.

A blocking solenoid can have a blocking position configured to physically block the switch handle from moving to an ON position. The blocking solenoid can have a cleared state configured to physically clear the switch handle for movement of the switch handle to the ON position.

The controller can be configured to perform a self-test, also referred to herein as a self-check, of the circuit after a user moves a switch handle of the breaker body from an OFF toward an ON position. This can prevent completion of closing the isolation contacts or closing the solid-state breaking switch if the self-test indicates a fault and can allow closing of the isolation contacts and of the solid-state breaking switch if the self-test indicates no fault. The controller can be configured to perform methods as described below.

A method includes receiving input indicative of movement of a switch handle of a circuit breaker from an OFF position toward an ON position of the switch handle and blocking the switch handle from further movement toward the ON position while keeping a main circuit through a circuit breaker open. The method includes closing a solid-state breaking switch in the main circuit and detecting first feedback indicative of current passing through the solid-state breaking switch. If the first feedback is indicative of no fault, the method includes allowing movement of the switch handle to the ON position, allowing closing the isolation contacts, and allowing current to flow through the main circuit. Otherwise, if the first feedback is indicative of a fault, the method includes preventing movement of the switch handle to the ON position, preventing closing the isolation contacts, and preventing current to flow through the main circuit.

Closing the solid-state breaking switch can be performed temporarily, including opening the solid-state breaking switch before allowing closing the isolation contacts (if the first and second feedback are indicative of no fault), or preventing closing the contacts (if the first and second feedback are indicative of a fault). Receiving input indicative of movement of a switch handle can include receiving a signal from a test switch indicating closing of the test switch resulting from interaction of the test switch with the switch handle moving from an OFF position toward an ON position of the switch handle. Allowing current to flow through the main circuit can include closing the solid-state breaking switch after receiving input from the test switch opening indicative of movement of the test handle to the ON position. Blocking the switch handle from further movement toward the ON position can include blocking movement of the switch handle with a solenoid. Allowing closing the isolation contacts can include retracting the solenoid so the switch handle can move to the ON position. The method can include depowering the solenoid as the switch handle is reaching the ON position or after the switch handle has reached the ON position.

Detecting first feedback indicative of current passing through the solid-state breaking switch can include receiving current pulse amplitude, start time, and end time of current in a test circuit while the solid-state breaking switch is temporarily closed indicative of no fault in the main circuit. Detecting first feedback indicative of current passing through the solid-state breaking switch can include receiving no current pulse amplitude, or wrong start time or end time of current in a test circuit while the solid-state breaking switch is temporarily closed indicative of faulting in the main circuit. Preventing closing the isolation contacts can include returning the switch handle to the OFF position after release of the switch handle by a user.

These and other features of the systems and methods of the subject disclosure will become more readily apparent to those skilled in the art from the following detailed description of the example embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, example embodiments thereof will be described in detail herein below with reference to certain figures, wherein.

DETAILED DESCRIPTION OF THE EMBODIMENTS

Figure 1:
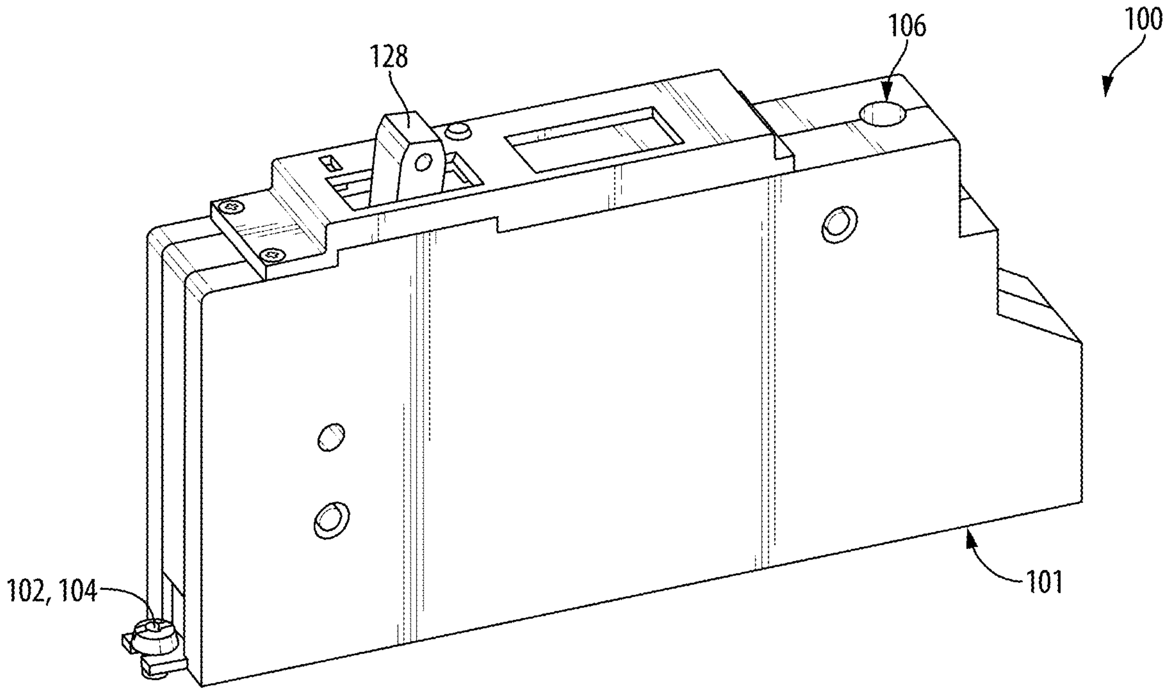
FIG. 1 is a perspective view of an embodiment of a circuit breaker constructed in accordance with the present disclosure, showing the switch handle.

Reference will now be made to the drawings wherein like reference numerals identify similar structural features or aspects of the subject disclosure. For purposes of explanation and illustration, and not limitation, a partial view of an embodiment of a circuit breaker in accordance with the disclosure is shown in FIG. 1 and is designated generally by reference character 100. Other embodiments of systems in accordance with the disclosure, or aspects thereof, are provided in FIGS. 2-14, as will be described. The systems and methods described herein can be used to provide for a way to detect if the solid-state part of a solid-state circuit breaker is working properly before the breaker is turned on energizing the downstream connected circuit. This can be used in circuit breakers such as miniature circuit breakers (MCBs) used in residential breaker boxes and the like.

Figure 2:
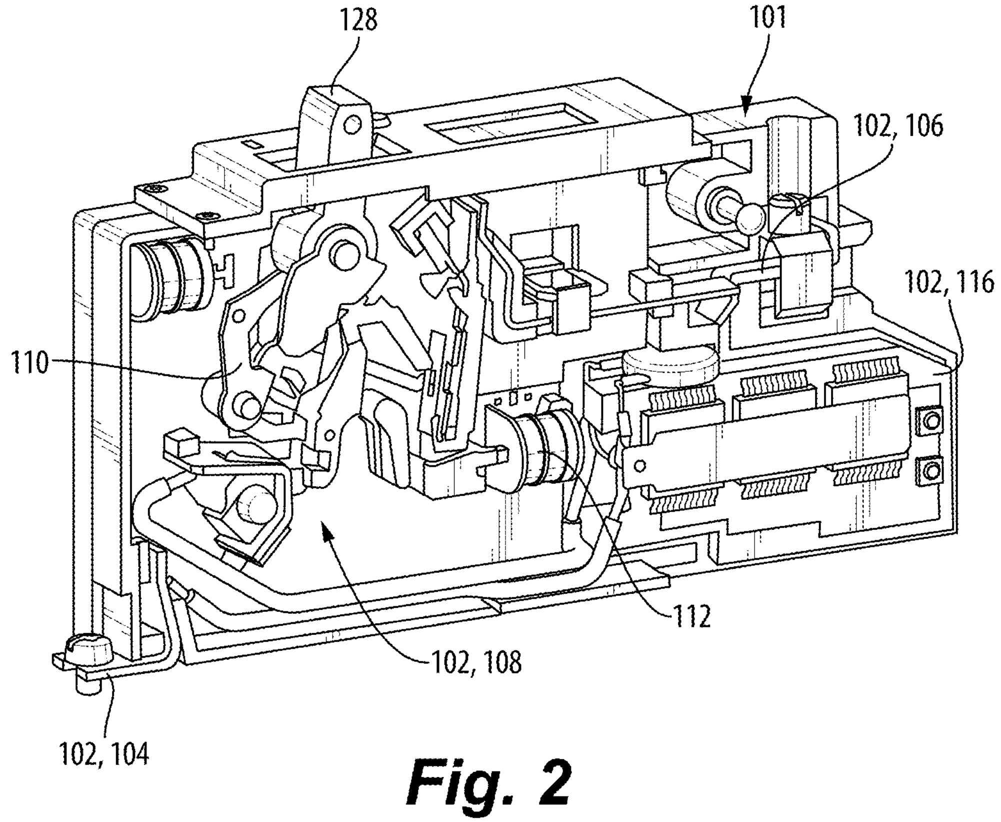
FIG. 2 is a perspective view of a portion of the circuit breaker of FIG. 1, showing internal features with part of the breaker housing removed.
Figure 3:
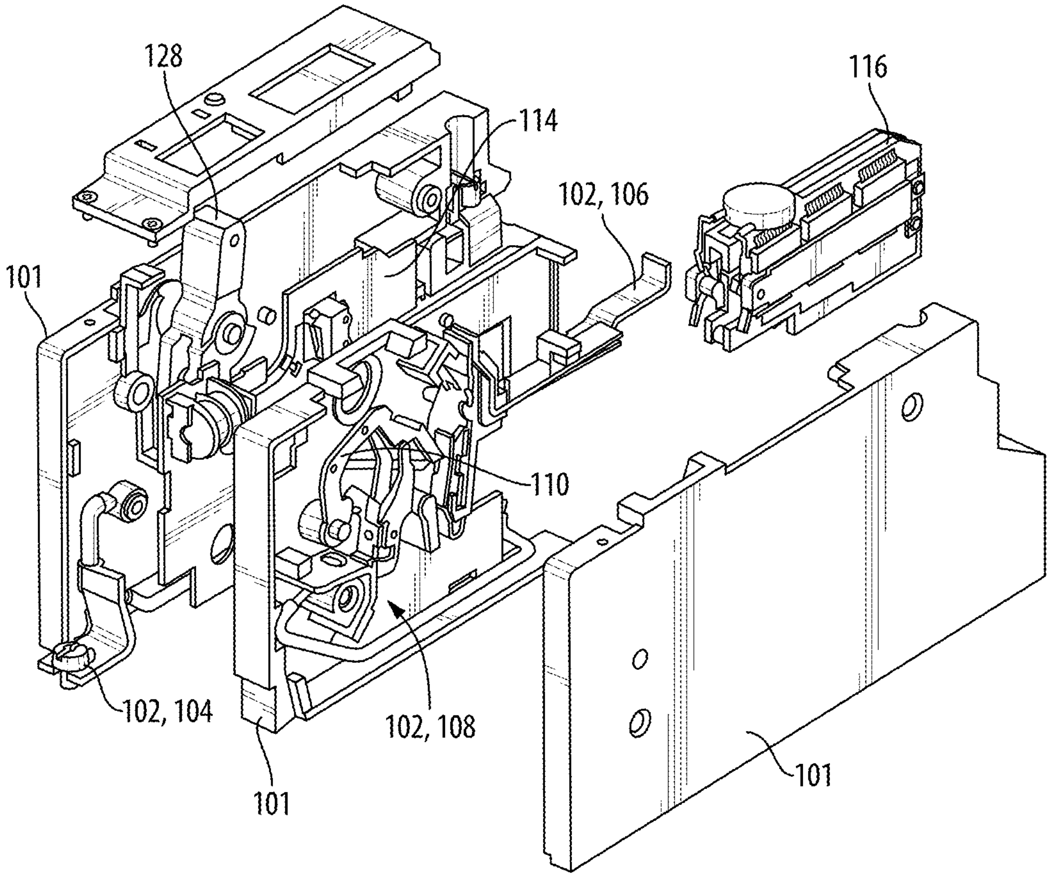
FIG. 3 is an exploded perspective view of the circuit breaker of FIG. 1, showing the mechanical breaker mechanism and the solid-state breaking device.
Figure 4:
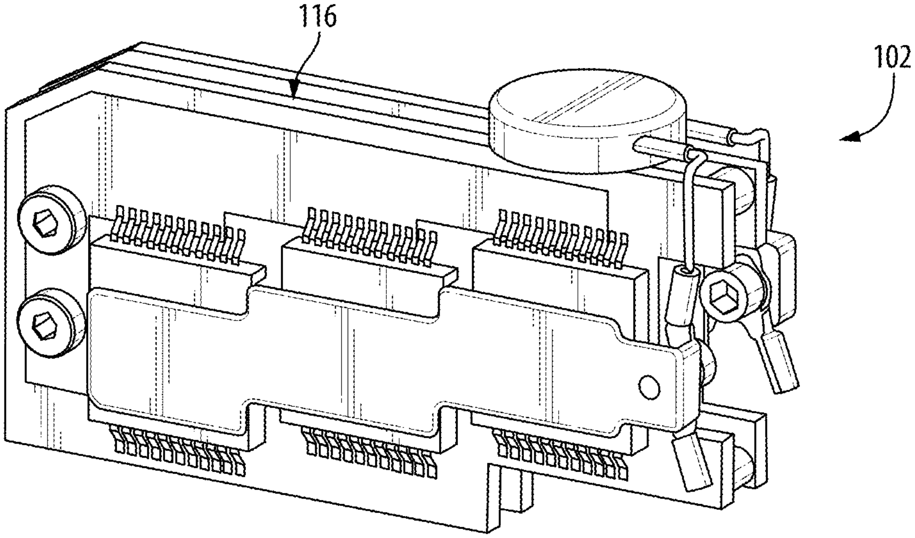
FIG. 4 is a perspective view of the solid-state breaking device of FIG. 3, showing the opposite side of what is visible in FIG. 3.
Figure 5:
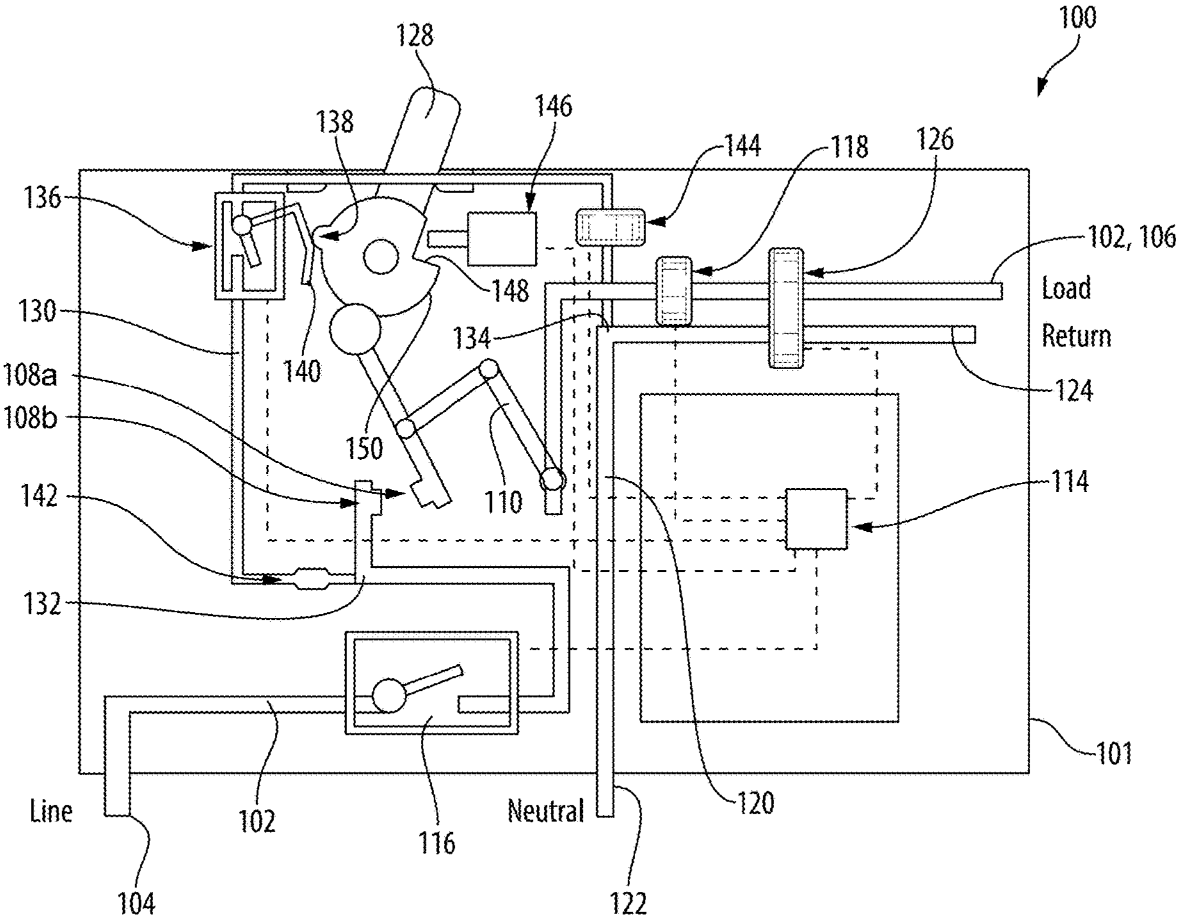
FIG. 5 is a schematic view of the circuit breaker of FIG. 1, showing the circuit breaker in the OFF state.

The circuit breaker 100 includes a breaker body 101 with a circuit 102 running therethrough from a line terminal 104 to a load terminal 106, which is labeled in FIG. 2. As shown in FIGS. 2-3, a pair of isolation contacts 108 in the circuit 102 are configured to close the circuit 102 in a closed state with the isolation contacts 108 touching one another (as shown schematically in FIG. 11) and to break the circuit 102 in an open state with the isolation contacts 108 spaced apart from one another as shown in FIG. 5. As labeled in FIG. 5, one of the isolation contacts 108 of FIG. 2 is a moving contact 108*a*, the other is a stationary contact 108*b*. A linkage 110 of a mechanical breaker mechanism and controller 114 controlled solenoid 112, labeled in FIG. 2, can cause the circuit 102 to break and go into a TRIPPED state if the controller 114 determines there is a fault in the circuit 102. Normally, in order to go from the TRIPPED state, the fault must be cleared, then a user must actuate the circuit breaker 100 to the OFF state to reset before returning to the ON state. The transition from the OFF state to the ON state (whether the OFF is a reset from a TRIPPED state, or simply from a user switching the breaker from the ON state directly to the OFF state) are discussed in further detail below with reference to FIGS. 7-11. A solid-state breaking switch 116 (shown schematically as a switch in FIG. 5) is connected in the circuit 102 in electrical series with the isolation contacts 108 so both the solid-state breaking switch 116 and the isolation contacts 108 have to be in a closed state in order for current to flow in the circuit 102. The solid-state breaking switch 116 can be configured for AC or DC applications. In an AC configuration, there can be three MOSFETs in parallel on one side of the solid-state breaking switch 116, e.g., on the side shown in FIG. 3, and three more MOSFETs in parallel on the other side, e.g., the side shown in FIG. 4, making a total of six MOSFETs in parallel back-to-back or anti-series configuration. In DC applications, only three MOSFETs are needed in parallel with one another. The MOSFETs are used in anti-series pairs to ensure blocking current from both directions when breaking the circuit 102. Although MOSFETs are described here, those skilled in the art will readily appreciate how to adapt JFET or IGBT configurations, or the like, for use as a solid-state breaking switch 116.

With reference now to FIG. 5, the controller 114, which can be a microcontroller unit (MCU) or the like, is operatively connected to control the solid state breaking switch 116, e.g., as indicated by the broken line in FIG. 5, based on the open state or the closed state of the isolation contacts 108 and based on electrical current passing through the circuit 102. A main circuit sensor 118 is operatively connected to the circuit 102 and to the controller 114 to provide feedback to the controller 114 indicative of electrical current in the circuit 102. A neutral line 120 runs through the breaker body 101 from a neutral terminal 122 to a return terminal 124. A ground fault circuit interrupter (GFCI) differential sensor 126 is operatively connected to the circuit 102 and to the controller 114 to provide feedback to the controller 114 indicative of ground fault status of the circuit 102. A switch handle 128 is operatively connected to the linkage 110 and the isolation contacts 108 to move a moveable one of the isolation contacts 108 between the open and closed states for manual control of the circuit 102 by a user.

Figure 11:
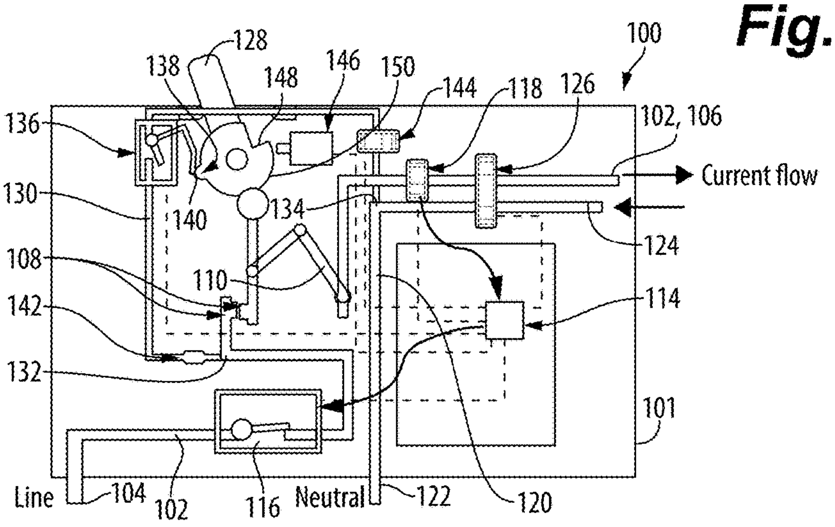

With continued reference to FIG. 5, a test circuit 130 is electrically connected to the main circuit 102 at a first node 132 that is in series between the isolation contacts 108 and the solid-state breaking switch 116. The test circuit 130 is electrically connected to the neutral line 120 at a second node 134 that is in series between the neutral terminal 122 and the GFCI differential sensor 126. A test switch 136 in the test circuit 130 is in electrical series between the first node 132 and the second node 134. The test switch 136 is operatively connected to the switch handle 128 and to the controller 114 to provide feedback to the controller 114 indicative of position of the switch handle 128. Note that in FIG. 5, the broken lines indicate connections to the controller 114. The switch handle 128 includes a protrusion 138 and the test switch includes a cam rocker 140. The cam rocker 140 and protrusion 138 are shaped to close the test switch 136 when the switch handle 128 is at a TRIPPED position, shown in FIG. 6, about half-way between the ON and OFF positions, which are shown in FIGS. 11 and 5, respectively. A test resistor 142 is connected in electrical series between the first node 132 and the test switch 136. A test sensor 144 is operatively connected to the test circuit 130 and to the controller 114 to provide feedback to the controller 114 indicative of electrical current in the test circuit 130.

Figure 8:
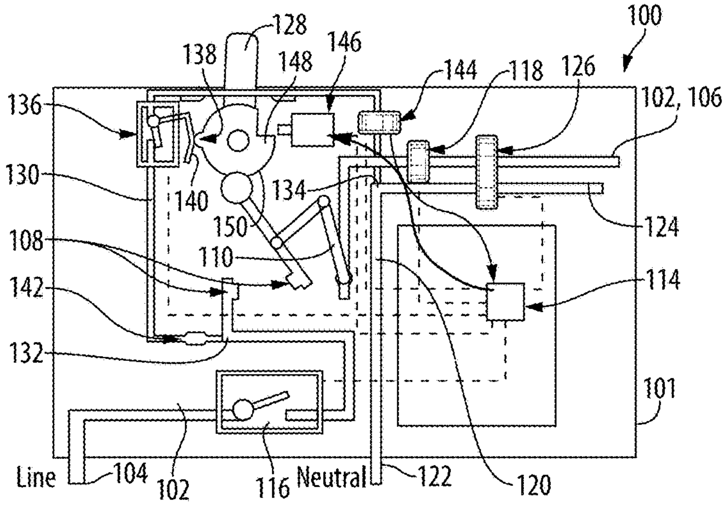
Figure 9:
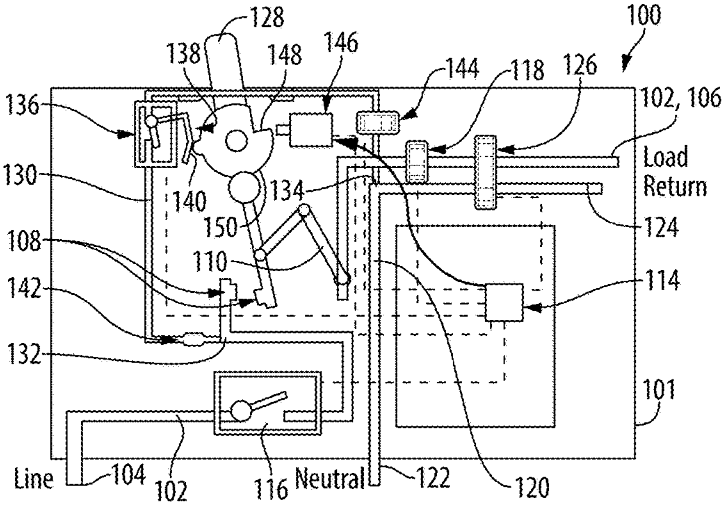

With reference still to FIG. 5, a blocking solenoid 146 has a blocking position, as shown in FIG. 5, configured to physically block the switch handle 128 from moving to the ON position, and a cleared state, as shown in FIG. 8, configured to physically clear the switch handle 128 for movement of the switch handle 128 to the ON position, which is shown in FIG. 11. The switch handle 128 includes a locking notch 148 that the blocking solenoid 146 engages in the blocking position and a cam surface 150 that the blocking solenoid 146 engages when the switch handle 128 is in the ON position and the blocking solenoid 146 is not being fired or powered. The blocking solenoid 146 is biased toward the blocking position shown in FIG. 5 and is configured to slide along the cam surface 150 until it can extend without command from the controller 114 into the locking notch as a user moves the switch from the ON position of FIG. 11 to the OFF position of FIG. 5. This ensures the blocking solenoid 146 blocks the switch handle 128 from moving back to the ON position until after the controller 114 can perform a self-check, i.e., the self-test described further below. If the self-test is clear, the controller 114 fires the blocking solenoid 146 momentarily, retracting the solenoid 146 long enough for a user to move the switch handle 128 past the TRIPPED position of FIG. 6, and when the test switch 136 indicates to the controller 114 that the switch handle 128 is in the ON position, the controller 114 deactivates the blocking solenoid 146, bringing it to rest against the cam surface 150 of the switch handle 128.

The controller 114 is configured, e.g., with machine readable instructions such as code, analog or digital logic, or the like, to perform a self-test, also referred to herein as a self-check, of the circuit 102 after a user moves a switch handle 128 of the breaker body from the OFF position toward the ON position. This prevents completion of further movement of the switch handle 128 from closing the isolation contacts 108 or closing the solid-state breaking switch 116 if the self-test indicates a fault and allows closing of the isolation contacts 108 and of the solid-state breaking switch 116 if the self-test indicates no fault. The controller 114 can use feedback from the sensors 118, 126, and/or 144 to determine whether a fault is present.

Figure 6:
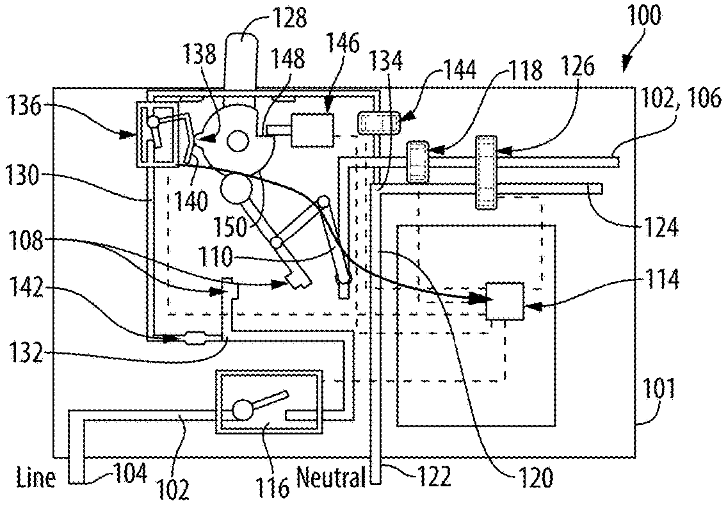
FIG. 6 is a schematic view of the circuit breaker of FIG. 5, showing the switch handle in transit from the OFF position toward the ON position and being blocked for a self-test.

With reference now to FIG. 6, the built in denial of service can operate as follows based on a self-test before closing main isolation contacts 108. In the position shown in FIG. 5, the user has placed the switch handle 128 into the OFF position from the ON position, or else has placed the switch handle 128 into the OFF position as a reset after a TRIPPED state of the circuit breaker 100. Then, as shown in in FIG. 6, as the user begins to move the switch handle 128 toward the ON position, the protrusion 138 and cam rocker 140 described above close the test switch 136. This signals the controller 114, which initiates the self-test. The blocking solenoid 146 is biased into the notch 148, blocking further movement beyond the position shown in FIG. 6, while waiting for a test result.

Figure 7:
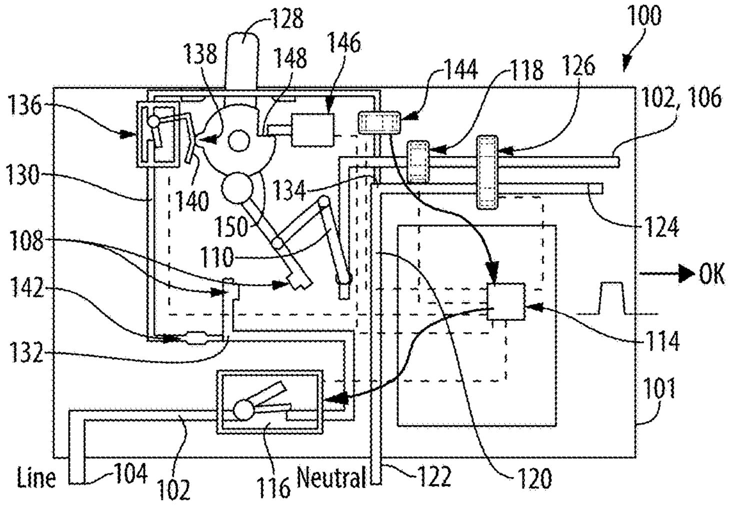
FIGS. 7-11 show stages in the circuit breaker of FIG. 5 going to the ON state after a self-test determines no faults are present in the circuit.
Figure 10:
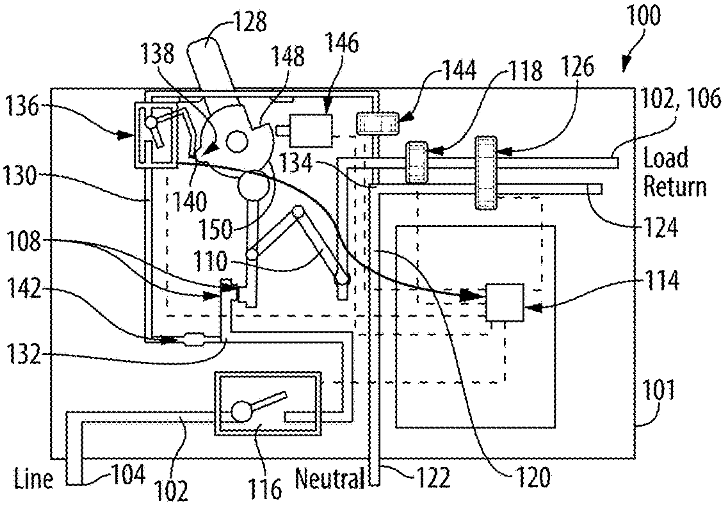

Referring now to FIG. 7, the self-test includes the controller 114 commanding the solid-state breaking switch 116 to close temporarily and then open. While the solid-state breaking switch 116 is temporarily closed, a small current pulse goes through solid state breaking switch 116 and through the test circuit 130. The sensor 144 produces feedback to the controller 114 indicative of current pulse amplitude, start time, and end time (duration). If these metrics meet or match predetermined or expected values, then the self-check passes, i.e., there is no fault in the main circuit 102. In this case, as shown in FIG. 8, the controller 114 fires the blocking solenoid 146, retracting the blocking solenoid 146 from engaging the notch 148 in the switch handle 128. This frees the switch handle 128 to continue toward ON. The self-test can occur so quickly, the user may not notice. As the user continues to move the switch handle 128 past the position in FIG. 8 to the position in FIG. 9, the blocking solenoid 146 stays retracted. The switch handle 128 reaches a toggle point where the isolation contacts 108 swing closed as shown in FIG. 10. In the position shown in FIG. 10, the protrusion 138 of the switch handle 128 and the cam rocker 140 of the test switch 136 open the test circuit 130. The controller 114 detects this through the feedback from the test switch 136 and shuts off the blocking solenoid 146. This extends the plunger of the blocking solenoid 146, which can rest on the cam surface 150 of the switch handle 128, without needing to draw power thereafter to remain retracted. Then, as shown in FIG. 11, the controller 114 commands the solid-state breaking switch 116 to close and current flow starts through main circuit 102. The sensors 118 and 126 allow the controller 114 to monitor the current magnitude for faults.

Figure 12:
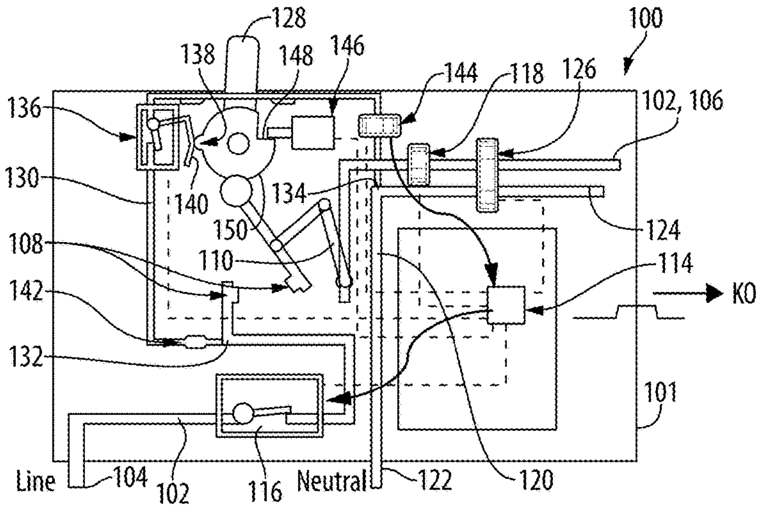
FIGS. 12-14 show states in the circuit breaker of FIG. 5 going back to the OFF state after a self-check determines there is a fault present in the circuit.
Figure 13:
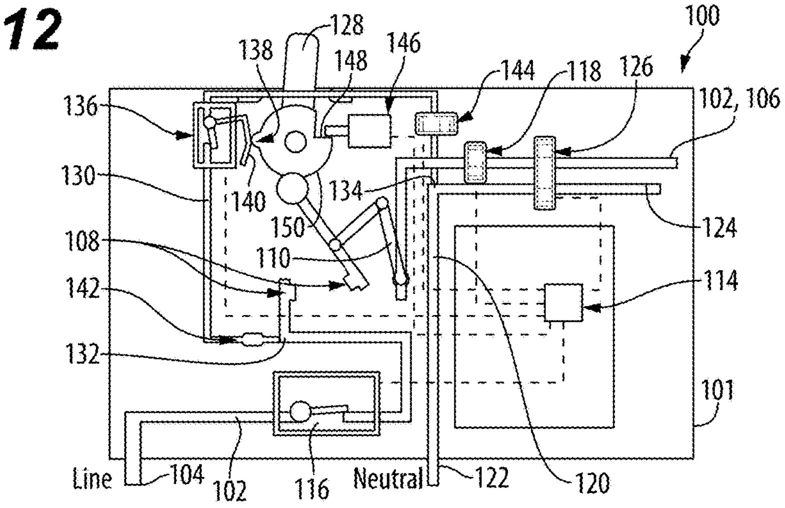
Figure 14:
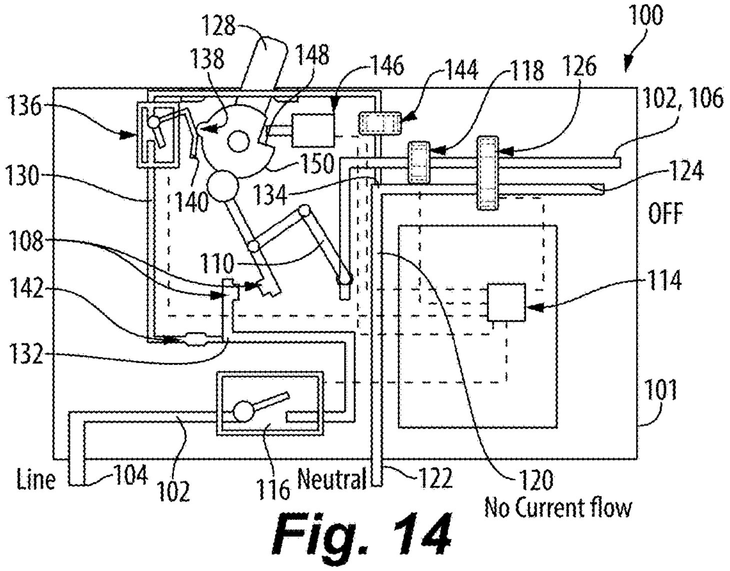

The foregoing description provides a sequence for the situation where the self-test passes given there are no faults in the circuit 102. On the other hand, if there are faults detected during the self-test, the controller 114 can follow the sequence shown in FIGS. 12-14. FIG. 12 shows the self-test failing in lieu of passing as in FIG. 7, which initiates a denial-of-service sequence shown in FIGS. 13-14. In FIG. 12, as in FIG. 7 described above, the controller 114 commands the solid-state breaking switch 116 to close and open rapidly, causing a small current pulse to go through the solid-state breaking switch 116 and through the test circuit 130. In this scenario, the feedback from the sensor 144 indicates to the controller 114 that there is no current pulse amplitude, or the wrong start time or end time (duration) and self-test fails. Then, in FIG. 13, the controller does not fire the blocking solenoid 146, denying the user's ability to continue moving the switch handle 128 toward the ON position. In FIG. 14, the blocking solenoid 146 stays extended, the user stops trying to move the switch handle 128 to the ON position. Any faults in the circuit 102 must be cleared and the switch handle 128 must return to the OFF position for resetting. The test switch 136, isolation contacts 108, and solid-state breaking switch 116 all stay open until the user makes another attempt to move the switch handle 128 into the ON position, e.g., after working to clear faults in the main circuit 102. If the fault is in the solid-state breaking switch 116 itself, the circuit breaker 100 may need to be replaced. Optionally, the controller 114 can indicate to the user that there is a fault and/or what is the fault type, e.g., using indicator lights, a display screen, or the like.

If the user has the switch handle 128 in the ON position shown in FIG. 11, the controller can control the solid-state breaker switch 116 to put the circuit breaker 100 in the ON or OFF states, e.g., upon a remote command from a user or the like. The controller 114 can also use feedback from the test switch 136 to control the open or closed state of the solid-state breaking switch 116 to match user movement of the switch handle 128 between the ON and OFF states.

The methods and systems of the present disclosure, as described above and shown in the drawings, provide for a way to detect if the solid state part of a solid state circuit breaker is working properly before the breaker is turned on energizing the downstream connected circuit for circuit breakers such as a miniature circuit breakers (MCBs) used in residential breaker boxes and the like. While the apparatus and methods of the subject disclosure have been shown and described with reference to example embodiments, those skilled in the art will readily appreciate that changes and/or modifications may be made thereto without departing from the scope of the subject disclosure.

What is claimed is:

1. A circuit breaker comprising:

a breaker body with a main circuit therein between a line terminal and a load terminal; a pair of isolation contacts in the main circuit configured to close the main circuit in a closed state with the isolation contacts touching one another and to break the main circuit in an open state with the isolation contacts spaced apart from one another;

a solid-state breaking switch in the main circuit in electrical series with the isolation contacts so both the solid-state breaking switch and the isolation contacts have to be closed in order for electrical current to flow in the main circuit; and a controller operatively connected to control the solid-state breaking switch based on the open state or the closed state of the isolation contacts and based on electrical current passing through the main circuit, wherein the controller is configured to perform a self-check of the circuit breaker after a user moves a switch handle of the breaker body from an OFF position toward an ON position, to inhibit completion of closing the isolation contacts or closing the solid state breaking switch if the self-check indicates a fault, and to allow closing of the isolation contacts and of the solid state breaking switch if the self-check indicates no fault.

2. The circuit breaker as recited in claim 1, further comprising a main circuit sensor operatively connected to the main circuit to provide feedback to the controller indicative of electrical current in the main circuit.

3. The circuit breaker as recited in claim 2, further comprising a neutral line in the breaker body connecting a neutral terminal to a return terminal.

4. The circuit breaker as recited in claim 3, further comprising a ground fault circuit interrupter (GFCI) differential sensor operatively connected to the main circuit to provide feedback to the controller indicative of ground fault status of the main circuit.

5. The circuit breaker as recited in claim 2, further comprising switch handle operatively connected to the isolation contacts to move a moveable one of the isolation contacts between the open and closed states for manual control of the main circuit by a user.

6. The circuit breaker as recited in claim 3, further comprising a test circuit electrically connected to the main circuit at a first node that is in series between the isolation contacts and the solid-state breaking switch and electrically connected to the neutral line at a second node.

7. The circuit breaker as recited in claim 6, further comprising a test switch in the test circuit in electrical series between the first node and the second node, wherein the test switch is operatively connected to the switch handle of the isolation contacts and to the controller to provide feedback to the controller indicative of a position of the switch handle.

8. The circuit breaker as recited in claim 7, further comprising:

a test sensor operatively connected to the test circuit and to the controller to provide feedback to the controller indicative of electrical current in the test circuit; and a blocking solenoid having a blocking position configured to physically block the switch handle from moving to an ON position, and a cleared state configured to physically clear the switch handle for movement of the switch handle to the ON position.

9. The circuit breaker as recited in claim 1, further comprising a test circuit electrically connected to the main circuit at a first node that is in series between the isolation contacts and the solid-state breaking switch and electrically connected to a neutral line at a second node.

10. The circuit breaker as recited in claim 1, wherein the self check comprises:

temporarily closing the solid-state breaking switch in the main circuit; and detecting feedback indicative of electrical current passing through the solid-state breaking switch.

11. A method for performing a self-check of a circuit breaker after a user moves a switch handle of a breaker body from an OFF position toward an ON position, to inhibit completion of closing isolation contacts or closing a solid state breaking switch if the self-check indicates a fault, and to allow closing of the isolation contacts and of the solid state breaking switch if the self-check indicates no fault, the method comprising:

receiving input indicative of movement of the switch handle of the circuit breaker from the OFF position toward the ON position;

blocking the switch handle from further movement toward the ON position while keeping a main circuit of the circuit breaker open;

closing the solid-state breaking switch in the main circuit; and detecting feedback indicative of electrical current passing through the solid-state breaking switch; and if the feedback is indicative of no fault, unblocking the switch handle from further movement toward the ON position, thereby allowing movement of the switch handle to the ON position, which allows closing the isolation contacts so that electrical current can flow through the main circuit; or else if the feedback is indicative of a fault, continue blocking the switch handle from further movement toward the ON position, thereby preventing closing the isolation contacts which prevents electrical current to flow through the main circuit.

12. The method as recited in claim 11, wherein closing the solid-state breaking switch is performed temporarily, including opening the solid-state breaking switch before either allowing closing the isolation contacts or preventing closing the contacts.

13. The method as recited in claim 11, wherein receiving input indicative of movement of the switch handle includes receiving a signal from a test switch indicating closing of the test switch resulting from interaction of the test switch with the switch handle moving from an OFF position toward an ON position of the switch handle.

14. The method as recited in claim 13, wherein allowing electrical current to flow through the main circuit includes closing the solid-state breaking switch after receiving input from the test switch opening indicative of movement of the test handle to the ON position.

15. The method as recited in claim 11, wherein blocking the switch handle from further movement toward the ON position includes blocking movement of the switch handle with a solenoid.

16. The method as recited in claim 15, wherein allowing closing the isolation contacts includes retracting the solenoid so the switch handle can move to the ON position.

17. The method as recited in claim 16, further comprising depowering the solenoid as the switch handle is reaching the ON position or after the switch handle has reached the ON position.

18. The method as recited in claim 11, wherein detecting first feedback indicative of electrical current passing through the solid-state breaking switch includes receiving electrical current pulse amplitude, start time, and end time of electrical current in a test circuit while the solid-state breaking switch is temporarily closed indicative of no fault in the main circuit.

19. The method as recited in claim 11, wherein detecting first feedback indicative of electrical current passing through the solid-state breaking switch includes receiving no electrical current pulse amplitude, or wrong start time or end time of electrical current in a test circuit while the solid-state breaking switch is temporarily closed indicative of faulting in the main circuit, and wherein preventing closing the isolation contacts includes returning the switch handle to the OFF position after release of the switch handle by a user.

20. A circuit breaker comprising:

a controller operatively connected to control a solid-state breaking switch based on an open state or a closed state of isolation contacts and based on electrical current passing through a main circuit, wherein the controller is configured to perform a self-check of the circuit breaker after a user moves a switch handle of a breaker body from an OFF position toward an ON position, to inhibit completion of closing the isolation contacts or closing the solid state breaking switch if the self-check indicates a fault, and to allow closing of the isolation contacts and of the solid state breaking switch if the self-check indicates no fault, wherein the controller includes machine readable instructions that, when executed by the controller, cause the circuit breaker to:

receive input indicative of movement of the switch handle from the OFF position toward the ON position of the switch handle;

block the switch handle from further movement toward the ON position while keeping the main circuit open;

close the solid-state breaking switch;

detect feedback indicative of electrical current passing through the solid-state breaking switch; and if the feedback is indicative of no fault, unblock the switch handle from further movement toward the ON position, thereby allowing movement of the switch handle to the ON position, which allows closing the isolation contacts so that electrical current can flow through the main circuit; or else if the feedback is indicative of a fault, continue to block the switch handle from further movement toward the ON position, thereby preventing closing the isolation contacts which prevents electrical current to flow through the main circuit.

* * * * *